Jan. 16, 1968  L. ABRAHAM  3,364,413
LOGIC CONTROL CIRCUIT FOR AN INVERTER
Filed July 22, 1964
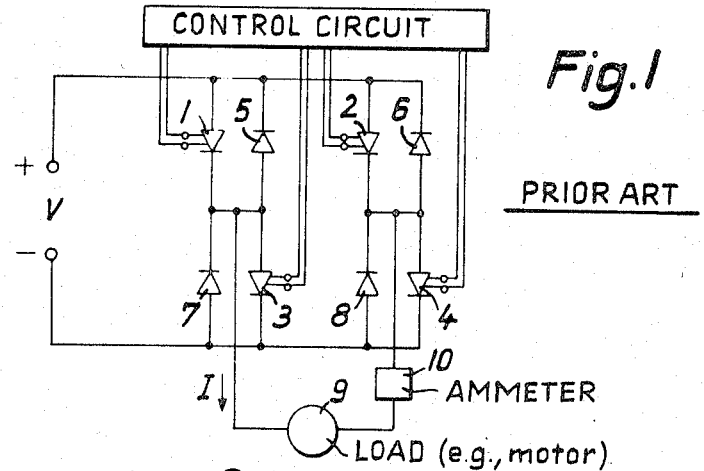
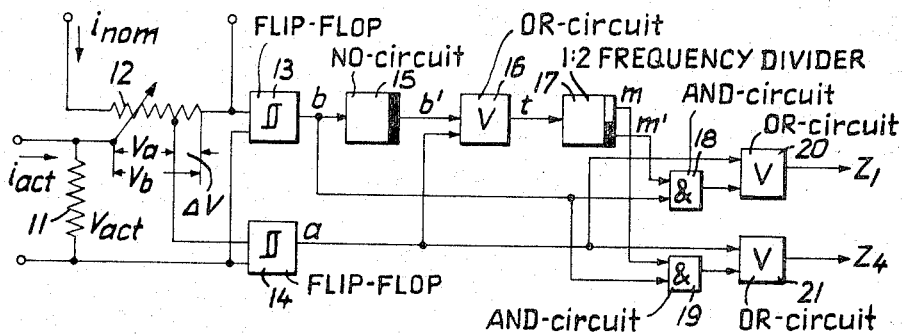
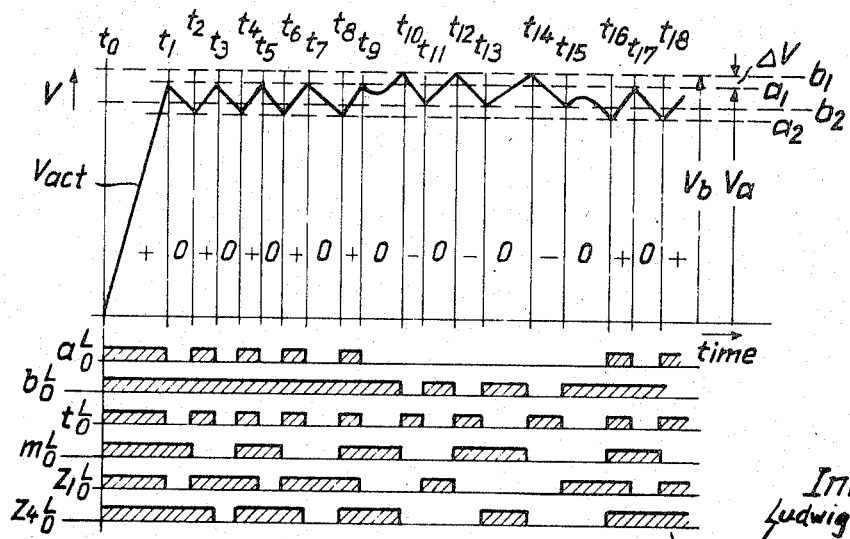
Inventor:
Ludwig Abraham
By Spencer & Kaye
ATTORNEYS United States Patent Office 3,364,413
Patented Jan. 16, 1968

3,364,413
LOGIC CONTROL CIRCUIT FOR AN INVERTER
Ludwig Abraham, Berlin, Germany, assignor to Licentia Patent-Verwaltungs-G.m.b.H., Frankfurt, Germany
Filed July 22, 1964, Ser. No. 384,469
Claims priority, application Germany, July 29, 1963, L 45,492
8 Claims. (Cl. 321—18)

ABSTRACT OF THE DISCLOSURE

An inverter capable of assuming three conditions is coupled to a load circuit. In the first condition, the inverter applies a driving voltage to the load, in the second condition, it applies a counter voltage to the load, and in the third condition it connects an idler circuit to the load. A comparison circuit having two trigger elements with different response levels is connected to the load for comparing the actual current flowing through the load with a nominal current value. A logic circuit is connected between the comparison circuit and the inverter for switching the inverter between its three states in response to different output combinations of the two trigger elements in the comparison circuit.

---

The present invention relates to a control circuit for a pulse-type inverter, i.e., an electronic inverted converter for changing a direct current voltage into an alternating current voltage, in which not only the frequency of the A.C. voltage but also the amplitude of the fundamental of the A.C. voltage can be controlled by pulsing. Such pulse-type inverters have the characteristic feature that a positive or negative voltage can be applied to the load at any desired instant, irrespective of the direction of the output current. Depending on how the inverter is connected, particularly if the inverter is connected as a bridge circuit, a third so-called idler condition can be achieved wherein zero voltage or short-circuit is applied to the load.

FIGURE 1 shows one embodiment of a conventional single-phase inverter connected as a bridge. The inverter comprises four fully controllable rectifiers 1, 2, 3, 4. The rectifiers 1, 4, lie in one set of opposite bridge arms while the rectifiers 2, 3, lie in the other set of opposite bridge arms. The term "controlled" rectifier, as used hereinafter, is intended to refer to a multiple electrode rectifier element, including a triode, which is fully controlled in that it can be not only "ignited," i.e., rendered conductive, but also "extinguished," i.e., rendered non-conductive, by suitable means, e.g., a separate commutator arrangement, for example, by means of extinguishing capacitors. In other words, the current of such a rectifier can thus be turned on or off. The inverter of FIGURE 1 further comprises four inverse or backward current diodes 5, 6, 7, 8, each connected in parallel with a respective one of the controlled rectifiers. The inverter is connected to a suitable control circuit by means of which the rectifiers can be rendered conductive and non-conductive, as well as to a load 9 constituted, for example, by the winding of a single or polyphase motor. The load current I is measured by a suitable ammeter 10.

A driving voltage is applied to the load 9 when the rectifiers 1 and 4 are rendered conductive, whereupon a positive load current I begins to flow. When the two rectifiers 1, 4, are extinguished, i.e., rendered non-conductive, the load current I can continue to flow, against the battery voltage V, via the diodes 6, and 7, i.e., a counter E.M.F. (electromotive force) is applied. If, during the flow of positive load current I, only the rectifier 4 is extinguished while the rectifier 1 remains conductive, an idler circuit is formed via rectifiers 1 and 6, and no voltage is applied across the load 9. Similarly, an idler circuit is formed via rectifiers 4 and 7 when the rectifier 4 but not rectifier 1 remains conductive.

It will thus be seen that the inverter can be made to assume any one of three distinct conditions, depending on the state of conductivity of the rectifiers 1 and 4:

(1) A driving current is applied to the load when both of the rectifiers 1 and 4 are conductive.

(2) A counter voltage is applied when both of the rectifiers 1 and 4 are non-conductive.

(3) An idler circuit is formed, resulting in the application of no voltage across the load, when one of the two rectifiers 1 and 4 is conductive and the other of these two rectifiers is non-conductive.

The above applies to a positive load current, and, analogously, the state of conductivity of the rectifiers 2 and 3 determines which of the three conditions, i.e., the application of a driving current, the application of a counter voltage, and the application of no voltage, will prevail during a negative load current I. Thus, with the help of the three operating conditions for each current direction, and by adjusting the control circuit accordingly, the load 9 can have applied to it an alternating current voltage of any desired frequency and having a fundamental of any desired amplitude.

In many cases, and particularly when the inverter is to be used for regulating the rotational speed of A.C. motors, it is better if, instead of adjusting the voltage applied across the load 9, the current I through the load 9 is regulated directly. It then becomes difficult to provide a suitable detector or discriminator which is able to indicate which of the three operating conditions, namely, driving voltage, counter voltage, idling, should be switched in, and it is the primary object of the present invention to solve this problem.

Accordingly, the present invention resides, mainly, in a circuit arrangement relating to an inverter capable of assuming the above-described three conditions, namely, a first condition in which a driving voltage is applied to the load, a second condition in which a counter voltage is applied to the load, and a third condition in which an idler circuit is connected to the load. The circuit according to the present invention incorporates comparison means which include two trigger elements having different response levels for comparing the actual current flowing through the load with a nominal value, i.e., a nominal current. The outputs of these trigger elements are connected to a logic circuit which determines which of the three conditions the inverter is to assume. This is done by causing the inverter to assume the first condition when both of the trigger elements determine that the actual current through the load is smaller than the nominal current, by causing the inverter to assume its second condition when both of the trigger elements determine that the actual current through the load is greater than the nominal current, and by causing the inverter to assume its third condition when the trigger element having the higher response level determines that the actual current through the load is smaller than the nominal load and the trigger element having the lower response level determine that the actual current through the load is greater than the nominal current.

Additional objects and advantages of the present invention will become apparent upon consideration of the following description when taken in conjunction with the accompanying drawings in which:

FIGURE 1, already referred to above, shows an inverter of a type known per se.

FIGURE 2 is a circuit diagram of an inverter control circuit according to the present invention.

FIGURE 3 is a graph of a value, i.e., a voltage, proportional to the actual current, as a function of time.

FIGURE 3 also shows, in alignment with the graph, the presence or absence of signals at certain points in the circuit of FIGURE 2.

Referring now to the drawing and to FIGURES 2 and 3 thereof in particular, the former shows a circuit incorporating a resistor 11 through which flows the actual current $i_{act}$ so that there appears across the resistor a voltage $v_{act}$ which is proportional to $i_{act}$. A second resistor 12 is provided, through which flows the nominal current $i_{nom}$, this being the current which should flow in order to obtain the desired regulation. Therefore, there is formed across the resistor 12 a voltage $v_b$ which is proportional to the nominal current $i_{nom}$. This voltage $v_b$ is subtracted from $v_{act}$, and the difference between $v_{act}$ and $v_b$ is applied to a first binary trigger or so-called flip-flop 13. A nominal voltage $v_a$, which is applied to a second trigger flip-flop 14, is smaller than $v_b$ by a preset amount $\Delta v$.

Each of the flip-flops is able to assume one of two binary states so that, depending on which state each respective trigger is in, there will appear either a signal L (L being used to represent the binary "one") or a signal 0 at the outputs of the respective flip-flops. The output of flip-flop 14 is indicated at $a$. So long as the input has an amplitude less than $a_2$ (see the graph of FIGURE 3), the output at $a=L$; when the amplitude increases past $a_2$ to $a_1$, the flip-flop changes its state and the output signal $a=L$ becomes $a=0$ and does not change back to $a=L$ until the amplitude of the signal drops down once more to $a_2$. The output $b$ of flip-flop 13 acts similarly, in that $b=L$ until the input signal goes past $b_2$ and reaches $b_1$, whereupon $b=0$, not to change to $b=L$ until the input signal drops down to $b_2$. As is also shown in the graph of FIGURE 3, $a_1-a_2=b_1-b_2$ with $\Delta v$ being the difference between $b_1$ and $a_1$. This means that both flip-flops may, in practice, be constituted by identical components having inherently the same response threshold, the difference in response level being obtained by applying input signals that are displaced with respect to each other.

Continuing with the description of the circuit of FIGURE 2, the output of flip-flop 13 is connected to the input of a NO-circuit 15, i.e., a negation or complement circuit which puts out a 0 signal when its input is L, and vice versa. The output of stage 15, shown at $b'$, is applied to one of the two inputs of an OR-circuit 16 whose other input is connected to the output $a$ of flip-flop 14. The output $t$ is applied to the input of a 1:2 frequency divider 17, whose purpose will be described below. The frequency divider 17 has affirmed and negated outputs $m$ and $m'$, the latter being connected to one input of an AND-circuit 18 whose other input is connected to the output $b$ of flip-flop 13. The affirmed output $m$ of the frequency divider 17 is connected to one input of a further AND-circuit 19 whose other input is connected to the output $b$ of flip-flop 13. The output of AND-circuit 18 is connected to one input of a further OR-circuit 20 whose other input is connected to the output $a$ of flip-flop 14, while the output of AND-circuit 19 is connected to one input of yet another OR-circuit 21 whose other input is likewise connected to output $a$ of flip-flop 14. The outputs of OR-circuits 20 and 21 are referenced, respectively, $z_1$ and $z_4$, and constitute, respectively, the pulses which ignite, i.e., render conductive, the rectifiers 1 and 4 shown in FIGURE 1.

Expressed in logic notation, $t=a+\bar{b}$ from which $m$ and $\bar{m}$ are derived by frequency division $$1:2; z_1=a+(\bar{m} \& b); \text{ and } z_4=a+(m \& b)$$

FIGURE 3 shows $v_{act}$ as a function of time and illustrates the operation of the two flip-flops 13, 14. At instant $t_0$, both of the flip-flops put out a signal showing that $v_{act}$ is smaller than a given value. Such output signal will (as stated above) be considered to be constituted by the L signal, i.e., at $t_0$, $a=L$ and $b=L$. Under these conditions, a driving voltage has to be applied to the load in order to increase the actual voltage $v_{act}$. At instant $t_1$, the voltage $v_{act}$ will have increased to reach the value $a_1$, whereupon flip-flop 14 changes its state and output signal $a=0$. At this instant, the circuit is switched to idling in order to decrease $v_{act}$. When $v_{act}$ reaches the lower limit $a_2$ at instant $t_2$, the flip-flop 14 is again changed over to $a=L$. A driving voltage is once again applied. This process is repeated, with the actual current going up and down, until, in the illustrated example, the instant $t_8$. The circuit is again switched to idling at instant $t_9$, in order to drop the voltage $v_{act}$. But let it now be assumed that the load produces such a voltage that $v_{act}$ continues to increase even during idling. As a result, the upper limit $b_1$ of the flip-flop 13 is reached at instant $t_{10}$, which too, now, changes its output signal, from $b=0$ to $b=L$. At this instant, then, a counter voltage is applied to the load, as a result of which $v_{act}$ drops. The lower limit $b_2$ of flip-flop 13 is reached at instant $t_{11}$, as a result of which $b=L$ and the circuit is once again changed over to idling. Thus, $v_{act}$ continues to go up and down between $b_1$ and $b_2$ until instant $t_{14}$. At instant $t_{15}$, the circuit is switched to idling; it is assumed that afterwards the current will continue to drop until instant $t_{16}$, when the voltage $v_{act}$ reaches the limit $a_2$. This causes the circuit to be switched back such that a driving voltage is once more applied to the load.

In this way, the combination of signals appearing at $a$ and $b$ determines which of its three operating conditions the inverter is to operate at.

In the example depicted by FIGURE 3, $a=L, b=L$ driving voltage (+)
$a=0, b=L$ idling (0)
$a=0, b=0$ counter voltage (−)
(At no time is $a=L, b=0$.)

In the case of positive current I (FIGURE 1), the inverter is switched to idling by rendering either rectifier 1 or rectifier 4 conductive while, in the case of negative current, the load is connected to the idler circuit by rendering either one of the two rectifiers 2 and 3 conductive.

In order to work all of the circuit components equally, and thereby to lengthen the life expectancy of the system as a whole, it is best if both of the two idler circuits which can be formed by each set of opposite bridge arms, are made to alternate, i.e., by first using one and then the other. This change-over of the idler circuit is obtained, in the circuit according to the present invention, by using the mentioned 1:2 frequency divider 17 which itself is a conventional piece of equipment, so that when the circuit is switched to idling and it is rectifier 1 which is rendered conductive, it will be the rectifier 4 which is rendered conductive when the circuit is switched to idling the next time. E.g., if, in the example depicted by FIGURE 3, the rectifier 1 is the one which is rendered conductive during the time interval between $t_9$ and $t_{10}$, it will be the rectifier 4 which is conductive during the time interval between $t_{11}$ and $t_{12}$.

The operation of the circuit will thus be readily understood, particularly when taken in conjunction with the graph of FIGURE 3, as well as the aligned time plots showing the signals (L or 0) appearing at $a, b, t, m$ ($\bar{m}$ being the negative of $m$), $z_1$ and $z_4$. The comparison circuit includes the triggers 13 and 14. The output $t$ indicates whether or not the circuit is to be switched to idling, with $t=0$ indicating that the circuit is to be switched to idling, and $t=L$ indicating that the circuit is not to be switched to idling. The signals at $a, b$ and $m$ are combined, in the logic network constituted by elements 18, 19, 20, 21, in the manner described above, to give an indication as to whether or not the controlled rectifiers 1 and 4 are to be rendered conductive.

An analogous circuit is provided for the rectifiers 2 and 3, i.e., a further logic circuit which is similar in structure and operation to the above-described logic circuit, for applying similar control pulses $z_2$, $z_3$, to the remaining two controlled rectifiers which are in the other set of opposite arms of the bridge, i.e., rectifiers 2 and 3.

It will be seen from the above that the inverter is effectively controlled by comparing the actual current flowing through the load with a nominal current at two different response levels, and by causing the inverter to assume its condition (1) when the actual current through the load is determined, at both response levels, to be smaller than the nominal value, by causing the inverter to assume its condition (2) when the actual current through the load is determined, at both response levels, to be greater than the nominal current, and by causing the inverter to assume its condition (3) when the actual current through the load is determined, at the higher of the two control levels, to be smaller than the nominal current and, at the lower of the two levels, to be greater than the nominal current.

It will be understood that the above description of the present invention is susceptible to various modifications, changes and adaptations, and the same are intended to be comprehended within the meaning and range of equivalents of the appended claims.

What is claimed is:

1. A circuit arrangement comprising, in combination:
   (a) an inverter capable of assuming three conditions in the first of which a driving voltage is applied to a load, in the second of which a counter voltage is applied to the load, and in the third of which an idler circuit is connected to the load;
   (b) comparison means coupled to the output of the inverter and incorporating two trigger elements having different response levels for comparing the actual current flowing through the load with a nominal current; and
   (c) logic means connected to the output of said comparison means and to said inverter for causing said inverter to assume said first condition when both of said trigger elements determine that the actual current through the load is smaller than the nominal current, for causing said inverter to assume said second condition when both of said trigger elements determine that the actual current through the load is greater than the nominal current, and for causing said inverter to assume said third condition when the trigger element having the higher response level determines that the actual current through the load is smaller than the nominal current and the trigger element having the lower response level determines that the actual current through the load is greater than the nominal current.

2. A circuit arrangement as defined in claim 1 wherein said trigger elements are similar to each other and wherein said comparison means include means for deriving two signals, mutually displaced from each other, from a common component and for applying the two mutually displaced signals to said trigger elements, thereby to obtain responses therefrom at different levels.

3. A circuit arrangement as defined in claim 1 wherein said inverter includes two sets of components, each set being usable independently of the other for connecting an idler circuit to the load in consequence of which said inverter is capable of assuming said third condition by the use of either one of said two sets of components; and wherein said logic means include means for causing said two sets of components, whenever said inverter is made to assume said third condition, to be used alternately.

4. A circuit arrangement as defined in claim 3 wherein said last-mentioned means comprise a 1:2 frequency divider.

5. For use with an electronic inverter, a circuit arrangement comprising, in combination:
   (a) means for producing a voltage $v_{act}$ which is proportional to the actual current flowing through a load to which the inverter is connected;
   (b) means for producing a first voltage $v_b$ and a second voltage $v_a = v_b - \Delta v$, each of which voltages is proportional to a nominal current which is to flow through the load;
   (c) two trigger elements A and B;
   (d) means for applying the difference between $v_{act}$ and $v_a$ to the input of said trigger element A; and
   (e) means for applying the difference between $v_{act}$ and $v_b$ to the input of said trigger element B.

6. In combination with a circuit arrangement as defined in claim 5 wherein the inverter includes four controlled rectifiers connected in a bridge circuit, each controlled rectifier having a backward diode connected in parallel, a logic circuit connected to the outputs $a$ and $b$ of said trigger elements A and B for applying, to two of said rectifiers which are in opposite arms of the bridge, control pulses $z_1$, $z_4$, that render said two rectifiers conductive, said logic circuit including means for operating in accordance with the following logic functions:

$$z_1 = a + (m \ \& \ b)$$
$$z_4 = a + (\overline{m} \ \& \ b)$$

where $m$ and $\overline{m}$ are derived from $t$ by frequency division 1:2, and $t = a + \overline{b}$.

7. In combination with the circuit arrangement as defined in claim 6, a further logic circuit similar in structure and operation to the first-mentioned logic circuit for applying similar control pulses $z_2$, $z_3$, to the remaining two controlled rectifiers which are in the other set of opposite arms of the bridge.

8. A method of controlling an inverter, capable of assuming three conditions in the first of which a driving voltage is applied to a load, in the second of which a counter voltage is applied to the load, and in the third of which an idler circuit is connected to the load, said method comprising the steps of comparing the actual current flowing through the load with a nominal current at two different response levels; and causing the inverter to assume its first condition when the actual current through the load is determined at both response levels to be smaller than the nominal current, causing the inverter to assume its second condition when the actual current through the load is determined, at both response levels, to be greater than the nominal current, and causing the inverter to assume its third condition when the actual current through the load is determined, at the higher of the two levels, to be smaller than the nominal current and, at the lower of the two levels, to be greater than the nominal current.

References Cited

UNITED STATES PATENTS

| | | | |
|---|---|---|---|
| 3,027,508 | 3/1962 | Johnson | 321—45 X |
| 3,091,729 | 5/1963 | Schmidt | 321—45 X |
| 3,241,038 | 3/1966 | Amato | 321—44 |
| 3,273,045 | 9/1966 | Benson | 321—43 |
| 3,052,833 | 9/1962 | Coolidge | 321—45 X |

JOHN F. COUCH, *Primary Examiner.*

W. M. SHOOP, JR., *Assistant Examiner.*